(12) United States Patent
Pick

(10) Patent No.: US 7,591,358 B2
(45) Date of Patent: Sep. 22, 2009

(54) HYDRAULIC CONTROL SYSTEM AND APPARATUS FOR FRICTION CLUTCH

(76) Inventor: Dean Pick, 160 - 12811 Clarke Place, Richmond, British Columbia (CA) V6V 2H9

( * ) Notice: Subject to any disclaimer, the term of this patent is extended or adjusted under 35 U.S.C. 154(b) by 348 days.

(21) Appl. No.: 11/519,404

(22) Filed: Sep. 12, 2006

(65) Prior Publication Data

US 2008/0060900 A1    Mar. 13, 2008

(51) Int. Cl.
*F16D 48/06* (2006.01)
*F16D 25/08* (2006.01)

(52) U.S. Cl. .................. 192/83; 192/85 CA; 192/91 A

(58) Field of Classification Search ............ 192/83, 192/91 A, 85 C, 85 CA; 60/566
See application file for complete search history.

(56) References Cited

U.S. PATENT DOCUMENTS 2,501,005 A * 3/1950 Rockwell ................ 192/91 A

| 6,170,624 | B1  | 1/2001 | Arai et al. |
| 6,533,056 | B1  | 3/2003 | Maimone |
| 6,685,232 | B2* | 2/2004 | Sampson ............... 285/190 |
| 2005/0016168 | A1* | 1/2005 | Singh ..................... 60/413 |

FOREIGN PATENT DOCUMENTS

| EP | 1 510 718 A1 | 2/2005 |
| EP | 1 593 869 A1 | 9/2005 |
| WO | WO 2006/001625 A1 | 1/2006 |

\* cited by examiner

*Primary Examiner*—Richard M. Lorence
(74) *Attorney, Agent, or Firm*—Renner, Kenner, Greive, Bobak, Taylor & Weber

(57) ABSTRACT

An electro-hydraulic control system for a vehicle clutch, that operates in both a manual and an automatic mode. The invention provides a way of switching between operating modes not only when the clutch is engaged, but at any time while the vehicle is operating, smoothly and without shock, using a system that contains only one hydraulic circuit and reservoir.

17 Claims, 3 Drawing Sheets

HYDRAULIC CONTROL SYSTEM AND APPARATUS FOR FRICTION CLUTCH

FIELD OF THE INVENTION

The present invention relates to an apparatus and system for controlling a clutch, more specifically such an apparatus and system that operates in both a manual and an automatic mode.

BACKGROUND OF THE INVENTION

The characteristics of speed, torque (turning or twisting force), and power (rate or speed at which work is performed) for a typical internal combustion engine in a motor vehicle such as a motorcycle or a car usually do not match the requirements of the final propulsion component. For example, the range of output of the engine in a motorcycle does not match the range of requirements of the wheels in contact with the road surface. A clutch, disengageably connecting the engine to the transmission, provides the means to apply and remove engine torque to the transmission's input drive shaft.

A typical hydraulic clutch arrangement includes a clutch hand lever placed at the handlebars which actuates a master cylinder. The master cylinder is fluidly coupled to a slave cylinder mounted on or near the engine casing. The slave cylinder in turn actuates a push rod or alternatively a clutch lever which forcibly disengages the clutch. A hydraulic fluid reservoir typically attached at or near the master cylinder and becomes isolated from the system during master cylinder actuation. Spring biasing, integral to the clutch, biases the slave cylinder and master cylinder at rest so that the fluid reservoir may provide relief against environmental changes.

A typical hydraulic clutch is disengaged by depressing the clutch lever which compresses the master cylinder, generating pressure that actuates the slave cylinder, and transmits force along the push rod through to a pressure plate, lifting the pressure plate away from the clutch housing, relieving pressure between the friction and friction bearing elements, resulting in the disengagement of the engine from the transmission. This approach has a number of disadvantages, including the physical effort required to disengage the clutch lever which may lead to rider fatigue. Additionally, careful operation of the clutch lever in conjunction with the gear selector requires a level of concentration that may distract the rider and lead to loss of control. Also, mechanical clearances coupled with non-linear hydraulic effects limit clutch feedback and response, which in turn retards the rider's ability to finely control the clutch.

Many modern vehicles may incorporate a so-called automatic clutch instead of a manually-actuated clutch, such as the one described above, which automatically engages and disengages a friction clutch with some form of actuator.

The automatic clutch suffers from a number of drawbacks. If the automatic clutch fails, the vehicle is inoperable. There is no fail-safe mode of operation that permits the continued operation of the vehicle under those conditions. Additionally, the control system for automatics is not intuitive and may not respond to various driving situations when specific modes of clutch operation are desired. For example, the transmission may shift at a time when the rider of the vehicle does not expect it, which may lead to a loss of control.

In response, the so-called semi-automatic clutch was developed, which included both a manually-actuated clutch in addition to an automatic clutch. The known semi-automatic clutch has a problem when switching between the manual and the automatic modes of operation. During this switching process, when one mode is switched to the other mode during the disconnection of the clutch, the clutch may rapidly be engaged, which may cause unexpected acceleration and a jarring sensation.

In U.S. Pat. No. 6,170,624, a system is proposed to address connection shock. This application discloses a semi-automatic clutch that may prevent connection shock from occurring during the transfer from one mode to another, but only after the connection of the clutch is finished.

A drawback of the current state of the art in semi-automatic clutches is that there is a limitation on when the switch may occur between a manual mode and an automatic mode of operation. This limitation on timing prevents the operator from having the complete freedom to engage the manual override of the clutch at any time during operation of the vehicle.

Another drawback of the current state of the art is the complexity of the current semi-automatic systems. In particular, many alternative systems use a number of isolated hydraulic circuits, which require a separate reservoir for each hydraulic circuit. This complexity may increase the chances of mechanical failure during the prolonged operation that modern vehicles routinely endure, and increase the difficulty and cost of regular maintenance, and repair in the event of a failure.

There is a need to provide a way of switching between operating modes not only when the clutch is engaged, but at any time while the vehicle is operating, smoothly without shock, using a device that contains only one hydraulic circuit and reservoir.

SUMMARY OF THE INVENTION

An electro-hydraulic control system for a vehicle clutch, comprising:
  a sub-assembly, comprising:
    a manual hydraulic pressure source,
    an automatic hydraulic pressure source, and
    a slave cylinder that actuates a clutch,
  with both the automatic hydraulic pressure source and the manual hydraulic pressure source hydraulically feeding the slave cylinder; and
  a reservoir; and
  an isolation valve, connected hydraulically with the reservoir;

wherein the isolation valve isolates the reservoir from the sub-assembly during the actuation of either the manual hydraulic pressure source or the automatic hydraulic pressure source.

A controller, connected energetically to the isolation valve, the manual hydraulic pressure source, and the automatic hydraulic pressure source, actuates the isolation valve prior to the actuation of either the manual hydraulic pressure source or the automatic hydraulic pressure source so that the reservoir becomes isolated from the sub-assembly.

The controller, upon receiving a signal from the manual hydraulic pressure source, freezes the flow from the automatic hydraulic pressure source. Alternatively, the controller, upon receiving a signal from the manual hydraulic pressure source, dynamically controls the flow from the automatic hydraulic pressure source so as to transmit mechanical feedback through the manual hydraulic pressure source to a human operator.

An electro-hydraulic control system for a vehicle clutch, comprising:
  a first sub-assembly, comprising:

an automatic hydraulic pressure source, and
a slave cylinder that actuates a clutch;
a second sub-assembly comprising:
a manual hydraulic pressure source,
a reservoir, connected hydraulically with the manual hydraulic pressure source, and
a valve interposed between the manual hydraulic pressure source and the reservoir, the valve isolating the reservoir when the manual clutch cylinder is actuated; and
an isolation valve, connected hydraulically with the first sub-assembly and the second sub-assembly;
wherein both the automatic hydraulic pressure source and the isolation valve connect hydraulically to the slave cylinder, and the isolation valve isolates the first sub-assembly from the second sub-assembly during the actuation of the automatic hydraulic pressure source.

The manual hydraulic pressure source comprising a manual clutch cylinder connected mechanically to a clutch lever, the clutch lever being moved using direct human effort, wherein the reservoir is proximate the manual clutch cylinder and connected hydraulically with the manual clutch cylinder, and the valve is interposed between the manual clutch cylinder and a reservoir, the valve isolating the reservoir when the manual clutch cylinder is actuated.

A controller, connected energetically to the isolation valve, the manual hydraulic pressure source, and the automatic hydraulic pressure source, actuates the isolation valve prior to the actuation of the automatic hydraulic pressure source so that the reservoir becomes isolated from the sub-assembly.

The controller, upon receiving a signal from the manual hydraulic pressure source, freezes the flow from the automatic hydraulic pressure source. Alternatively, the controller, upon receiving a signal from the manual hydraulic pressure source, dynamically controls the flow from the automatic hydraulic pressure source so as to permit the depression of the clutch lever.

BRIEF DESCRIPTION OF THE DRAWINGS

Embodiments of the invention will be described by way of example and with reference to the drawings in which.

DETAILED DESCRIPTION OF THE INVENTION

Figure 1:
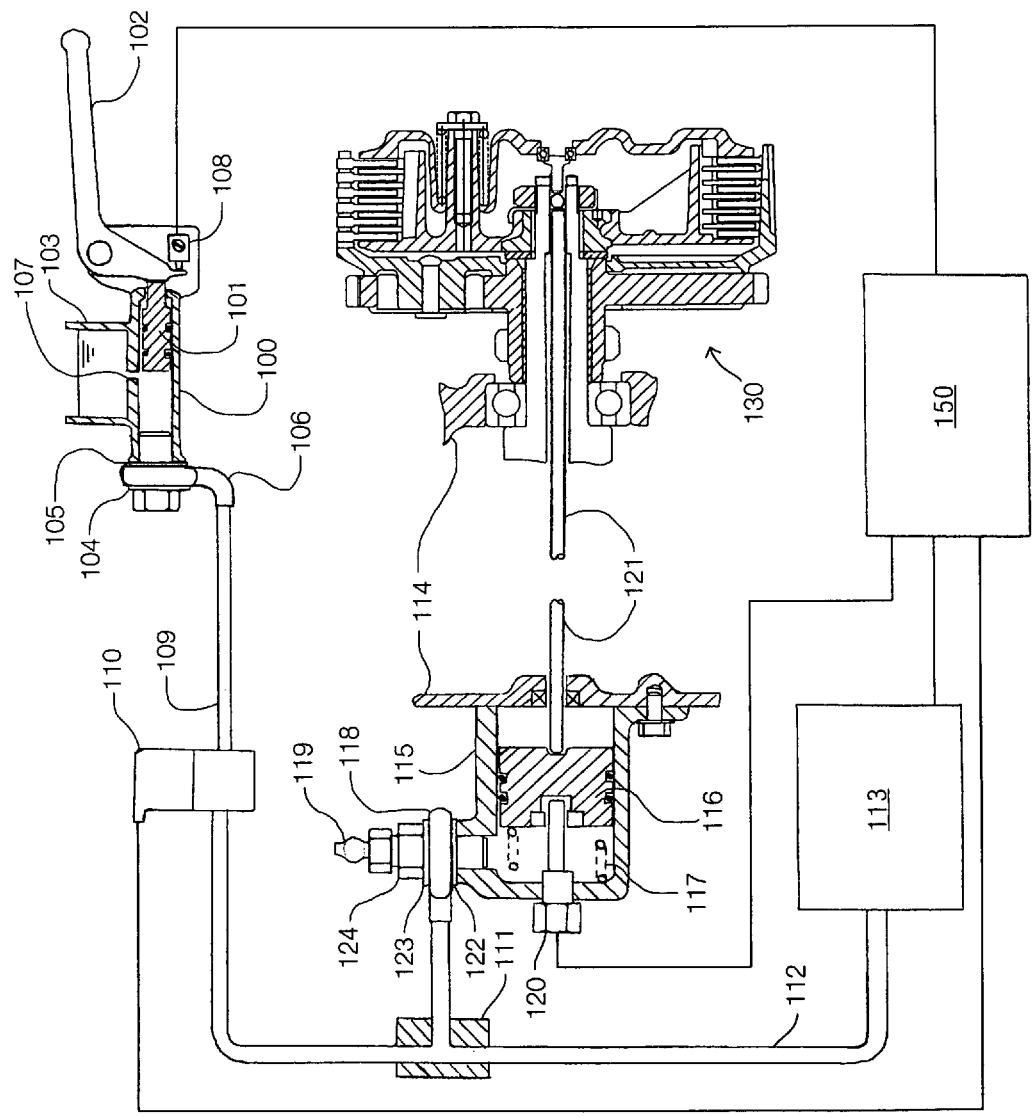
FIG. 1 is a schematic view of the invention.
Figure 2:
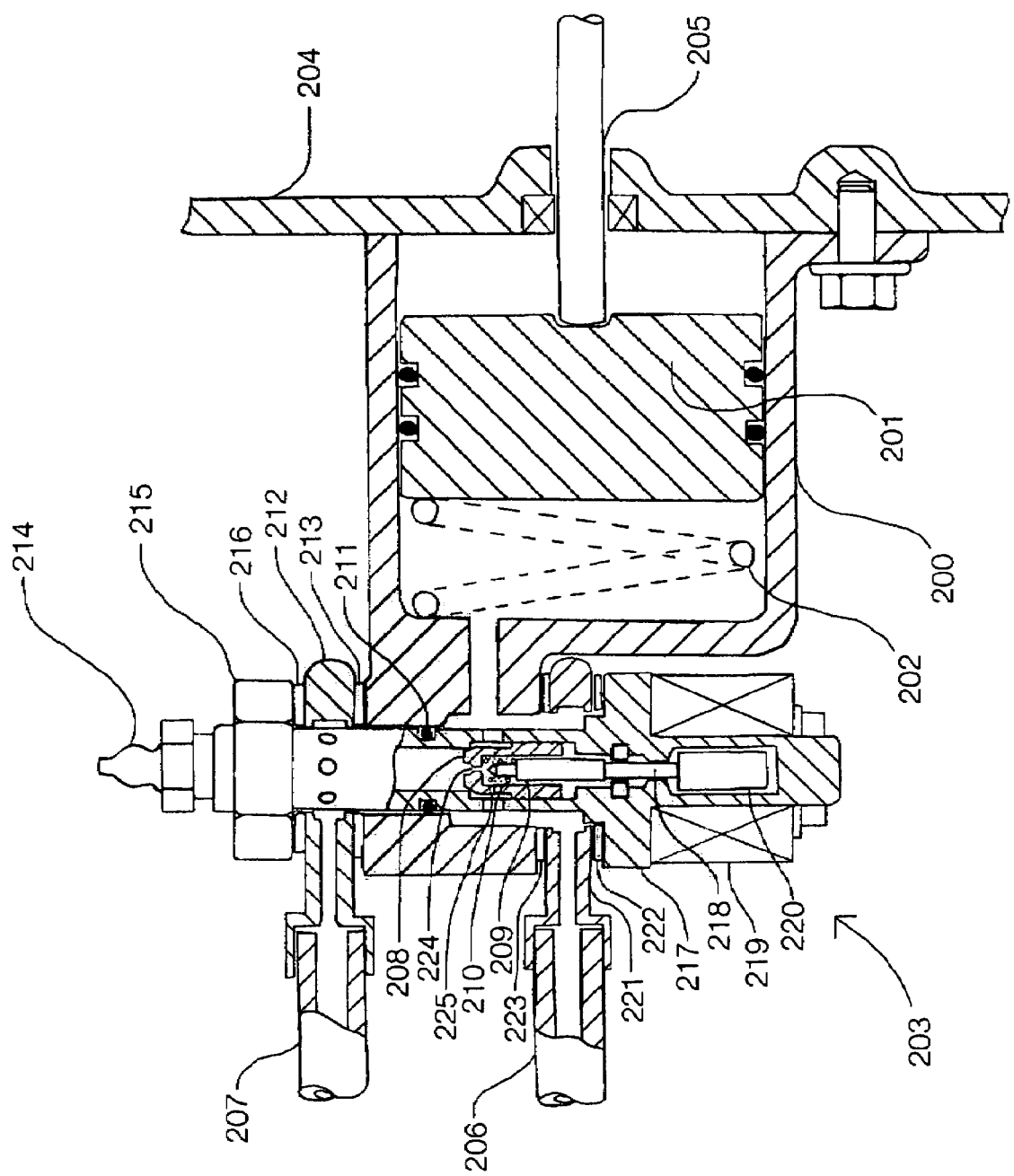
FIG. 2 is a cross-sectional view of an embodiment of the invention showing the slave cylinder and valve means, when the clutch is engaged.
Figure 3:
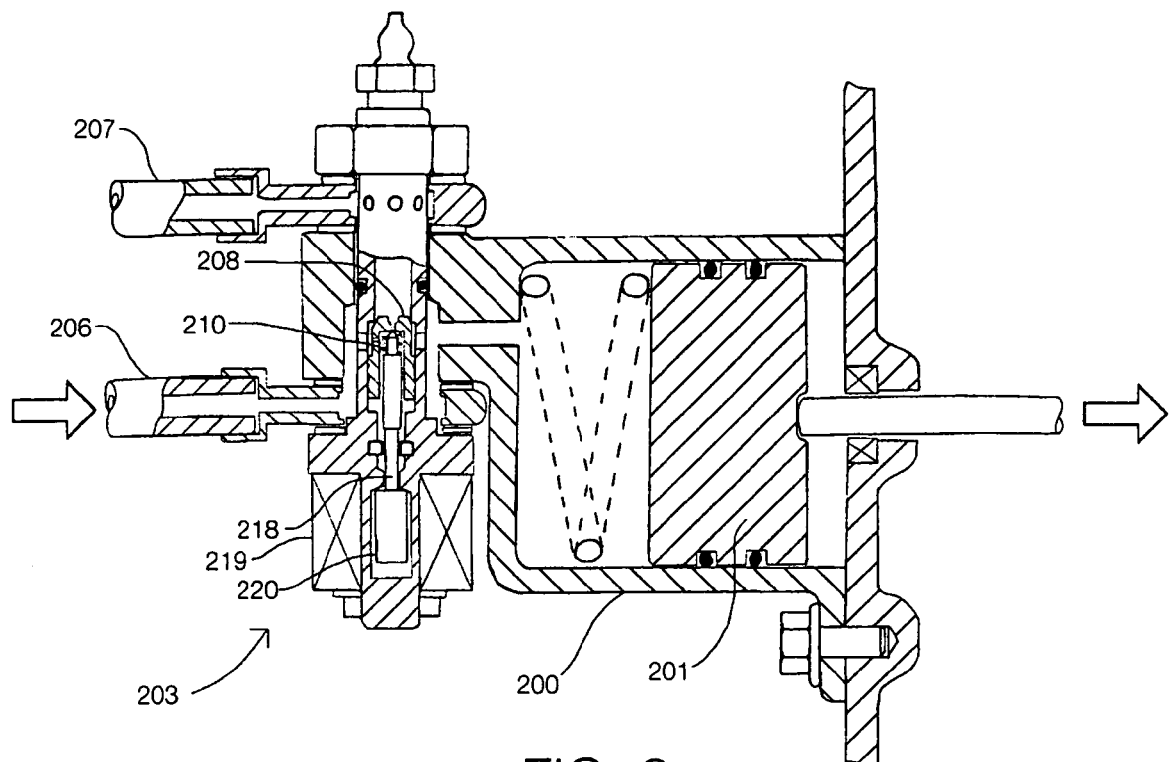
FIG. 3 is a cross-sectional view of an embodiment of the invention showing the slave cylinder and valve means, when the clutch is disengaged by the automatic hydraulic pressure source.
Figure 4:
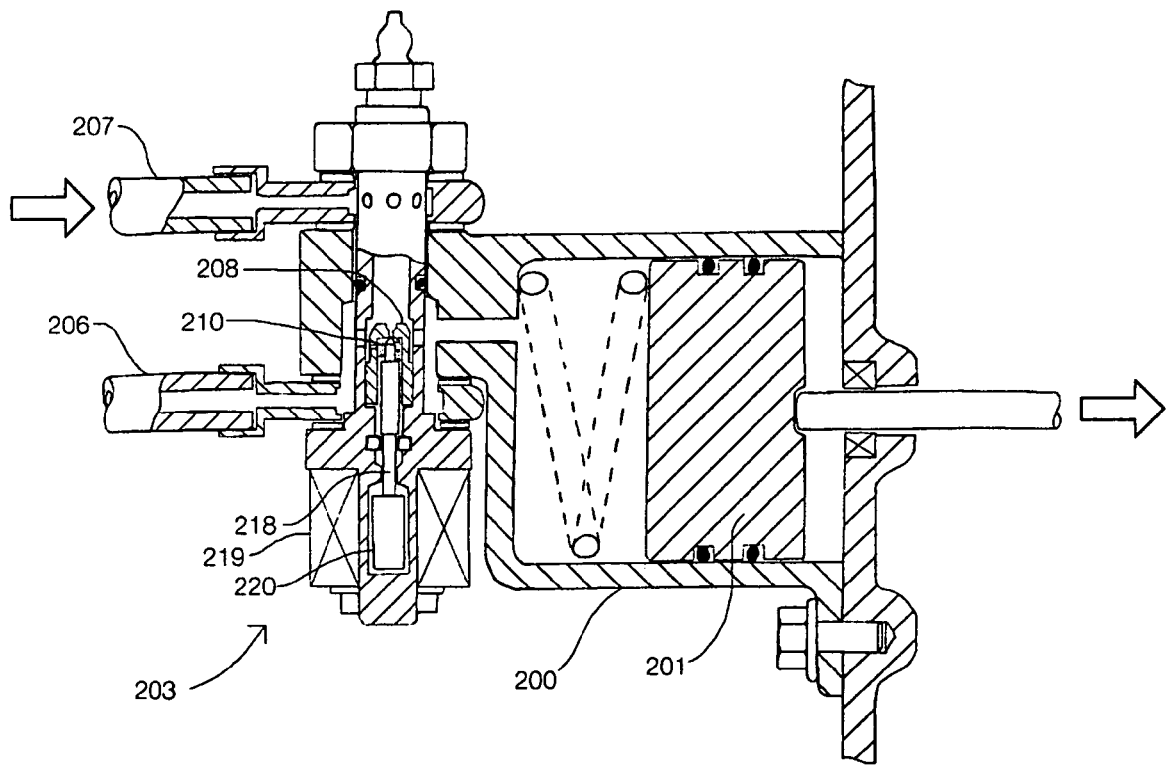
FIG. 4 is a cross-sectional view of an embodiment of the invention showing the slave cylinder and valve means, when the clutch is disengaged by the manual hydraulic pressure source.

FIG. 1 is one embodiment of the invention. FIG. 2 is a cross-sectional view of a second and preferred embodiment of the invention, at rest. FIG. 3 shows the embodiment in FIG. 2 when the primary hydraulic pressure source is actuated. FIG. 4 shows the embodiment in FIG. 2 when the manual hydraulic pressure source (the manual override) is actuated. The basic mechanism involves connecting a manual hydraulic pressure source 100 together with an automatic hydraulic pressure source 113 into a slave cylinder 115 so that when either pressure source is actuated, the clutch 130 is disengaged.

The manual hydraulic pressure source 100 and the automatic hydraulic pressure source 113 may be connected to a tee connection 111 through a manual hydraulic circuit line 109 and an automatic hydraulic circuit line 112, respectively. From the tee connection 111, the flow from either pressure source would travel into the slave cylinder 115, and force a piston 116 to travel. The movement of the piston 116 in turn places pressure on a push rod 121 that travels through the engine casing 114 to a friction clutch 130. A master cylinder piston 101, connected to the clutch lever 102, compresses the fluid in a master cylinder within the manual hydraulic pressure source 100.

An isolation valve 110 may be interposed between the manual hydraulic pressure source 100 and the tee connection 111 so as to ensure that when the automatic hydraulic pressure source 113 is activated, there may not be backflow along the manual hydraulic circuit line 109 into the manual hydraulic pressure source 100.

A controller 150 may be connected to the manual hydraulic pressure source 100 through a clutch switch 108 or other similar sensor so that the control system is signaled upon the actuation of the manual hydraulic pressure source 100 by a clutch lever 102. The controller 150 may also be connected to the slave cylinder 115 through a position sensor 120, which measures the position of the piston 116 within the slave cylinder 115. The controller 150 may also be connected to the isolation valve 110 to ensure the proper and timely activation of the isolation valve 110 during the actuation of the automatic hydraulic pressure source 113, and the deactivation of the isolation valve 110 when the pressure from the manual hydraulic pressure source 100 exceeds that present at the tee connection 111, and whenever neither pressure source 100, 113 is actuated and the system is at rest. The controller may be connected to the automatic hydraulic pressure source 113 to determine its state at any given time.

A reservoir 103 may be located at the manual hydraulic pressure source 100 so that when the master cylinder piston 101 travels past the reservoir tie-in point 107 during actuation, the master cylinder piston 101 seals off the reservoir from the rest of the system, preventing backflow to the reservoir 103 during an override event.

The connection of the hydraulic lines 112 109 to the various hydraulic components 100 115 113 may be made using banjo fittings 106 118, which may be sealed in place using crush washers 104 105 122 123 and bolts and nuts 124.

The slave cylinder 115 may be affixed to the engine casing 114. The slave cylinder 115 contains the piston 116. The piston 116 may be biased by a biasing spring 117 when the system is at rest. The slave cylinder 115 may incorporate a bleed screw 119, which allows the system to be easily bled of trapped air bubbles during maintenance.

During automatic operation of the clutch, upon determining that the clutch needs to be disengaged, the controller 150 first activates the isolation valve 110, so as to prevent backflow into the reservoir 103 and the manual hydraulic pressure source 100. The controller 150 next actuates the automatic hydraulic pressure source 113, which delivers pressure to the slave cylinder 115 and disengages the clutch 130. Once shifting of the transmission is completed, the clutch 130 may be reengaged by relaxing the pressure from the automatic hydraulic pressure source 113, which allows the piston 116 to return to a neutral position. Isolation of the manual hydraulic pressure source may no longer be required after the piston 116 returns to a neutral position and the automatic hydraulic pressure source 113 stops providing pressure, so the isolation valve 110 deactivates. This permits the system to equilibrate after each disengagement of the clutch, making it more tolerant of environmental changes and small leaks.

During manual operation of the clutch, the operator depresses the clutch lever 102, which both slides the master cylinder piston 101 and activates the clutch switch 108. The master cylinder piston 101 both isolates the reservoir 103 and delivers pressure to the slave cylinder 115. The isolation valve 110 remains deactivated throughout this operation, and the automatic hydraulic pressure source 113 remains static. Pressure on the piston 116 disengages the clutch 130. Once shifting of the transmission is completed, the clutch 130 may be reengaged by relaxing the clutch lever 102 which allows the piston 116 to return to a neutral position.

During a manual override of an automatic shifting event, the isolation valve 110 may be activated, followed by actuation of the automatic hydraulic pressure source 113, of the normal automatic operation described above. The operator may then depress the clutch lever 102 to override the clutch. Pressure may build in the manual hydraulic circuit line 109 as the operator squeezes, until the pressure in the manual hydraulic circuit line 109 exceeds that of the automatic hydraulic circuit line 112, triggering an override event. During an override event, the check valve contained within the isolation valve 110 may open, permitting the flow of fluid from the manual hydraulic pressure source 100 into both the slave cylinder 115 and the automatic hydraulic pressure source 113. Sensors, such as the clutch switch 108, may signal the controller 150 that there is an override event in progress. The controller 150 may freeze the automatic hydraulic pressure source 113, or alternatively may allow the automatic hydraulic pressure source 113 to absorb a volume of fluid at a rate equal to that being displaced by the master cylinder piston 101 as the clutch lever 102 is depressed. The later option is preferable, as it may provide the operator with feedback though the clutch lever 102, and may smooth the transition between the automatic and manual states.

The preferred embodiment shown in FIG. 2 integrates a number of the elements shown in FIG. 1 into an assembly integral to the housing of the slave cylinder 200. Specifically, the tee connection 111 and the isolation valve 110 may be incorporated into the slave cylinder 200 to make the system easier to install and maintain. The isolation valve 110 has taken on the form of a pilot operated—poppet type solenoid valve.

A manual pressure source (not shown) may be connected through the manual hydraulic circuit line 207 to the slave cylinder 200. This manual pressure source could take the form of the manual hydraulic pressure source 100 or a variation thereof such as any hand or foot operated lever or button assembly, or any mechanically operated pressure source that when actuated isolates the system reservoir (not shown).

An automatic hydraulic pressure source (not shown) may be connected through the automatic hydraulic circuit line 206 to the slave cylinder 200. Both circuit lines may be connected to the slave cylinder using a banjo fitting 216 and crush washers 212 213 as shown in FIG. 2.

The isolation valve 203 may comprise a valve body 217, a solenoid coil 219, a solenoid armature 220 connected to a plunger 218, and a poppet 208. The poppet may contain orifices 224 225 that act in conjunction with the plunger 218 to form a pilot valve 209 within the poppet 208. The pilot valve 209 may be biased with a biasing spring 210 to be open when the system is at rest, as shown in FIG. 2. On assembly, the isolation valve 203 may be passed though the banjo fitting 221 connected to the automatic hydraulic circuit line 206, the banjo fitting 221 having crush washers 222 223 on either side, through the slave cylinder 200 housing, and through the banjo fitting 212 to the manual hydraulic circuit line 207, the banjo fitting 212 having crush washers 213 216 on either side. A capping nut 215 may be used to fix the isolation valve 203 and the banjo fittings 212 221 in place. A bleed screw 214 may be included to allow trapped gas bubbles to escape during maintenance or repair of the system. A circuit isolation seal 211 may be placed on the outside of the isolation valve 203 so that there is no leakage between the circuit lines 207 206 along the outside of the valve.

The slave cylinder 200 may be affixed to the engine casing 204. The slave cylinder 200 contains the piston 201. The piston 201 may be biased by a biasing spring 202 when the system is at rest. During actuation of either or both of the pressure sources, the piston 201 may travel, putting pressure on the push rod 205, and disengaging the clutch.

When the system is at rest, and neither pressure source is actuated, the poppet 208 and the plunger 218 may be positioned as shown in FIG. 2. The biasing spring 210 may hold the pilot valve 209 open. The solenoid coil 219 may not be energized, the solenoid armature 220 may be in a neutral position, and the plunger 218 may be in a retracted position relative to the poppet 208, so the pilot valve 209 may be in an open position. Fluid in all pathways may be relaxed.

In FIG. 3, the automatic hydraulic pressure source is actuated. The solenoid coil 219 may be energized, the solenoid armature 220 may be in a forward position, and the plunger 218 may be in an engaged position relative to the poppet 208, so the pilot valve 209 may be in a closed position. The poppet 208 may be held closed by the force from the energized solenoid though the plunger 218 and pilot valve 209 combined with the pressure differential across the poppet 208. Fluid may be permitted to flow from the automatic hydraulic pressure source along the automatic hydraulic circuit line 206 around the isolation valve 203 and into the slave cylinder 200. The piston 201 may move under pressure as the fluid flows into the slave cylinder 200.

In FIG. 4, the manual hydraulic pressure source is actuated while the automatic hydraulic pressure source is actuated. Pressure may build up in the manual hydraulic circuit line 207. When the pressure in the manual hydraulic circuit line 207 exceeds that in the automatic hydraulic circuit line 206 and the pressure provided by the energized solenoid though the plunger 218 and though the pilot valve 209, the poppet 208, pilot valve 209, and the plunger 218 may all be forced downwards, permitting fluid to flow from the manual hydraulic circuit line 207 though the isolation valve 203 into both the automatic hydraulic circuit line 206 and the slave cylinder 200. This flow of fluid may maintain pressure on the piston 201, keeping the clutch disengaged. The automatic hydraulic pressure source may absorb a volume of fluid at a rate equal to that being displaced by manual hydraulic pressure source, providing the operator with feedback though the clutch lever 102, and smoothing the transition between the automatic and manual states.

A digital controller may be used, reading in data from sensor inputs such as switches and position sensors, and writing data to actuators such as relays and solenoids. An analog circuit may be used to support the digital controller. Position sensors, pressure transducers, or switches may be used to detect the states of the valves and cylinders, including to detect manual operation during normal operation, and may be used by the controller 150 to disable any automatic clutch operation except during engine damaging conditions.

The isolation valve 110 may be replaced with a simple on/off valve (not shown) that blocks flow during the activation of the automatic hydraulic force 100. Such a variant may require precise timing from the controller.

In one embodiment, the isolation valve and the reservoir are hydraulically connected with the hydraulic circuit formed between the manual hydraulic pressure source, the automatic hydraulic pressure source, and the slave cylinder, instead having the manual hydraulic pressure source interposed between the isolation valve and the reservoir, as described above.

It will be appreciated that the above description relates to the preferred embodiments by way of example only. Many variations on the system and method for delivering the invention without departing from the spirit of same will be clear to those knowledgeable in the field, and such variations are within the scope of the invention as described and claimed, whether or not expressly described.

What is claimed is:

1. An electro-hydraulic control system for a vehicle clutch, comprising:
    a. a first sub-assembly, comprising:
        i. an automatic hydraulic pressure source, and
        ii. a slave cylinder that actuates a clutch;
    b. a second sub-assembly comprising:
        i. a manual hydraulic pressure source,
        ii. a reservoir, connected hydraulically with the manual hydraulic pressure source, and
        iii. a valve interposed between the manual hydraulic pressure source and the reservoir, the valve isolating the reservoir when the manual hydraulic pressure source is actuated; and
    c. an isolation valve, connected hydraulically with the first sub-assembly and the second sub-assembly;
wherein both the automatic hydraulic pressure source and the isolation valve connect hydraulically to the slave cylinder, and the isolation valve isolates the first sub-assembly from the second sub-assembly during the actuation of the automatic hydraulic pressure source.

2. The electro-hydraulic control system of claim 1, wherein the manual hydraulic pressure source comprises a manual clutch cylinder connected mechanically to a clutch lever, the clutch lever being moved using direct human effort, wherein the reservoir is proximate the manual clutch cylinder.

3. The electro-hydraulic control system of claim 2, wherein the manual clutch cylinder is a single acting hydraulic cylinder comprising a piston and a bore in which the piston travels.

4. The electro-hydraulic control system of claim 3, wherein the reservoir is connected hydraulically with an aperture on the single acting hydraulic cylinder, and the valve comprises the piston and the aperture, the piston traveling upon actuation of the single acting hydraulic cylinder over the aperture, the piston blocking the aperture during actuation and preventing the flow of fluid to or from the reservoir.

5. The electro-hydraulic control system of claim 1, wherein a controller actuates the isolation valve prior to the actuation of the automatic hydraulic pressure source.

6. The electro-hydraulic control system of claim 5, wherein the controller, upon receiving a signal from the manual hydraulic pressure source, freezes the flow from the automatic hydraulic pressure source.

7. The electro-hydraulic control system of claim 5, wherein the controller, upon receiving a signal from the manual hydraulic pressure source, dynamically controls the flow from the automatic hydraulic pressure source so as to permit the depression of the clutch lever.

8. The electro-hydraulic control system of claim 5, wherein the isolation valve is overridden, permitting fluid to flow from the manual hydraulic circuit line though the isolation valve into both the automatic hydraulic circuit line and the slave cylinder, when the manual hydraulic pressure source is actuated during the actuation of the automatic hydraulic pressure source, and the resulting increase in pressure in a manual hydraulic circuit line between the manual hydraulic pressure source and the isolation valve exceeds that in an automatic hydraulic circuit line between the automatic hydraulic pressure source and the isolation valve and the resistance provided by isolation valve.

9. The electro-hydraulic control system of claim 8, wherein the automatic hydraulic pressure source absorbs a volume of fluid at a rate equal to that being displaced by manual hydraulic pressure source once the isolation valve has been overridden.

10. The electro-hydraulic control system of claim 8, wherein isolation valve comprises a valve body, a solenoid connected to a plunger, a poppet having orifices that act in conjunction with the plunger to form a pilot valve, and overriding the isolation valve comprises exceeding the resistance of the energized solenoid though the plunger and the pilot valve, thereby moving the poppet, pilot valve, and the plunger into an override position.

11. The electro-hydraulic control system of claim 1, wherein the isolation valve is a pilot operated, poppet solenoid valve.

12. The electro-hydraulic control system of claim 11, wherein the poppet solenoid valve is affixed directly onto the slave cylinder.

13. The electro-hydraulic control system of claim 12, wherein banjo fittings with crush washers placed between the banjo fittings are used to connect the pressure lines from the automatic hydraulic pressure source and the manual hydraulic pressure source.

14. The electro-hydraulic control system of claim 1, wherein the isolation valve and the slave cylinder are integrated together within a housing.

15. The electro-hydraulic control system of claim 14, wherein the housing is attached to an engine casing.

16. The electro-hydraulic control system of claim 1, wherein the actuation of the manual clutch cylinder is detected using any one or a combination of position sensors, pressure transducers, or clutch switches.

17. The electro-hydraulic control system of claim 1, wherein the isolation valve comprises an on/off valve that, upon actuation by the controller, blocks flow during the activation of the automatic hydraulic pressure source.

* * * * *